US009810016B2

(12) United States Patent
Pellini et al.

(10) Patent No.: US 9,810,016 B2
(45) Date of Patent: Nov. 7, 2017

(54) SPACER PROFILE FOR A SPACER FRAME FOR AN INSULATING GLASS UNIT WITH INTERSPACE ELEMENTS AND INSULATING GLASS UNIT

(71) Applicants: TECHNOFORM GLASS INSULATION HOLDING GMBH, Kassel (DE); Pellini S.p.A., Codogno (IT)

(72) Inventors: Alessandro Pellini, Codogno (IT); Giovanni Nicolosi, Codogno (IT); Karl Ricks, Codogno (IT); Matteo Dolcera, Kassel (DE)

(73) Assignees: TECHNOFORM GLASS INSULATION HOLDING GMBH, Kassel (DE); PELLINI S.P.A., Codogno (IT)

(*) Notice: Subject to any disclaimer, the term of this patent is extended or adjusted under 35 U.S.C. 154(b) by 265 days.

(21) Appl. No.: 14/377,520

(22) PCT Filed: Feb. 5, 2013

(86) PCT No.: PCT/EP2013/000344
§ 371 (c)(1),
(2) Date: Aug. 8, 2014

(87) PCT Pub. No.: WO2013/117320
PCT Pub. Date: Aug. 15, 2013

(65) Prior Publication Data

US 2015/0292258 A1 Oct. 15, 2015

(30) Foreign Application Priority Data

Feb. 10, 2012 (EP) .................................... 12154994

(51) Int. Cl.
*E06B 3/663* (2006.01)
*E06B 9/264* (2006.01)
(Continued)

(52) U.S. Cl.
CPC ............ *E06B 3/66314* (2013.01); *B32B 7/12* (2013.01); *B32B 17/064* (2013.01);
(Continued)

(58) Field of Classification Search
CPC ............... E06B 3/66314; E06B 3/6775; E06B 3/66319; B32B 7/12; B32B 17/10036; B32B 17/064; B32B 2419/00
See application file for complete search history.

(56) References Cited

U.S. PATENT DOCUMENTS 2,094,381 A 9/1937 Slayter
2,235,680 A 3/1941 Haven et al.
(Continued)

FOREIGN PATENT DOCUMENTS

BE 894946 A1 3/1983
CA 1082095 A 7/1980
(Continued)

OTHER PUBLICATIONS

International Search Report from PCT/EP2013/000344.
Written Opinion of the International Searching Authority in PCT/EP2013/000344.

*Primary Examiner* — Donald J Loney
(74) *Attorney, Agent, or Firm* — J-TEK Law PLLC; Jeffrey D. Tekanic; Scott T. Wakeman

(57) ABSTRACT

A spacer profile for an insulating glazing unit for maintaining a space between glazing panes includes a profile body formed from a first heat insulating material that has, viewed in a cross section perpendicular to a longitudinal direction, outer side walls extending in a height direction and that has
(Continued)

a distance in a transverse direction smaller than a first width, each side wall having an inner protrusion protruding towards the opposite side wall into a recess which is open to the inner side, and a diffusion barrier film made from a second material and firmly bonded with the profile body and, viewed in the cross section perpendicular to the longitudinal direction, extending over the profile body on the outer side of the spacer profile and continuous thereto in the height direction on the outside of the side walls and/or in the same to a second height and into the protrusions.

20 Claims, 6 Drawing Sheets

(51) Int. Cl.
*E06B 3/667* (2006.01)
*B32B 7/12* (2006.01)
*B32B 17/06* (2006.01)
*B32B 17/10* (2006.01)
*B32B 27/08* (2006.01)
*E06B 3/677* (2006.01)

(52) U.S. Cl.
CPC ........ *B32B 17/10036* (2013.01); *B32B 27/08* (2013.01); *E06B 3/667* (2013.01); *E06B 3/66319* (2013.01); *E06B 3/6775* (2013.01); *E06B 9/264* (2013.01); *B32B 2250/03* (2013.01); *B32B 2307/304* (2013.01); *B32B 2307/412* (2013.01); *B32B 2419/00* (2013.01); *E06B 2003/6638* (2013.01); *E06B 2003/66385* (2013.01); *E06B 2009/2643* (2013.01)

(56) References Cited

U.S. PATENT DOCUMENTS 2,525,717 A 10/1950 Ottenheimer
2,741,809 A 4/1956 Englehart
2,838,809 A 6/1958 Zeolla
2,873,486 A 2/1959 Hughes
2,877,516 A 3/1959 Bobel
2,915,793 A 12/1959 Berg
2,934,801 A 5/1960 Blaszkowski
2,974,377 A 3/1961 Kunkle
3,008,196 A 11/1961 Springer et al.
3,168,089 A 2/1965 Larkin
3,220,065 A 11/1965 Graham
3,702,040 A 11/1972 Roy
3,758,996 A 9/1973 Bowser
3,872,198 A 3/1975 Britton
3,998,680 A 12/1976 Flint
4,015,394 A 4/1977 Kessler
4,080,482 A 3/1978 Lacombe
4,149,348 A 4/1979 Pyzewski
4,222,213 A 9/1980 Kessler
4,407,105 A 10/1983 Frank
4,479,988 A 10/1984 Dawson
4,604,840 A 8/1986 Mondon
4,658,553 A 4/1987 Shinagawa
4,979,552 A 12/1990 van der Zanden
5,079,054 A 1/1992 Davies
5,125,195 A 6/1992 Brede
5,178,200 A 1/1993 Hagen
5,209,034 A 5/1993 Box et al.
5,290,611 A 3/1994 Taylor
5,302,425 A 4/1994 Taylor
5,313,761 A 5/1994 Leopold
5,313,762 A 5/1994 Guillemet
5,424,111 A 6/1995 Farbstein
5,439,716 A 8/1995 Larsen
5,460,862 A 10/1995 Roller
5,678,377 A 10/1997 Leopold
5,679,419 A 10/1997 Larsen
5,851,609 A 12/1998 Baratuci et al.
5,851,627 A 12/1998 Farbstein
5,962,090 A 10/1999 Trautz
6,061,994 A 5/2000 Goer et al.
6,108,999 A 8/2000 Smith et al.
6,192,652 B1 2/2001 Goer et al.
6,223,414 B1 5/2001 Hodek et al.
6,250,045 B1 6/2001 Goer et al.
6,272,811 B1 8/2001 Hagen
6,339,909 B1 1/2002 Brunnhofer et al.
6,355,328 B1 3/2002 Baratuci et al.
6,389,779 B1 5/2002 Brunnhofer
6,457,294 B1 10/2002 Virnelson et al.
6,537,629 B1 3/2003 Ensinger
6,613,404 B2 9/2003 Johnson
6,796,102 B2 9/2004 Virnelson et al.
6,989,188 B2 1/2006 Brunnhofer
7,081,300 B2 7/2006 Laurence et al.
7,827,760 B2 11/2010 Brunnhofer et al.
7,997,037 B2 8/2011 Crandell et al.
8,453,415 B2 6/2013 Brunnhofer et al.
8,640,406 B2 2/2014 Brunnhofer et al.
2001/0001357 A1 5/2001 Reichert
2003/0037493 A1 2/2003 Guhl et al.
2003/0066614 A1 4/2003 Sun et al.
2003/0173036 A1 9/2003 Kwon et al.
2003/0226645 A1 12/2003 Toti
2004/0163347 A1 8/2004 Hodek et al.
2005/0034386 A1 2/2005 Crandell et al.
2005/0100691 A1 5/2005 Bunnhofer et al.
2005/0153517 A1 7/2005 Kim et al.
2005/0210780 A1 9/2005 Lyness et al.
2006/0130427 A1 6/2006 Hodek et al.
2006/0150577 A1 7/2006 Hodek et al.
2006/0162281 A1 7/2006 Pettit et al.
2006/0260227 A1 11/2006 Winfield
2007/0116907 A1 5/2007 Landon et al.
2007/0125504 A1 6/2007 Early et al.
2007/0261358 A1 11/2007 Davis et al.
2008/0053037 A1 3/2008 Gallagher
2008/0110109 A1 5/2008 Hermens
2008/0134596 A1 6/2008 Brunnhofer et al.
2009/0120019 A1 5/2009 Trpkovski
2009/0120035 A1 5/2009 Trpkovski
2009/0246802 A1 10/2009 Langen
2010/0011703 A1 1/2010 Seele et al.
2010/0107526 A1 5/2010 Brunnhofer et al.
2010/0205881 A1 8/2010 Sønderkaer et al.
2011/0041427 A1 2/2011 Bouesnard
2012/0061031 A1 3/2012 Zhang
2012/0297707 A1 11/2012 Lenz et al.
2012/0297708 A1 11/2012 Brunnhofer et al.

FOREIGN PATENT DOCUMENTS

CA 2269715 A 5/1998
CN 2329746 7/1999
DE 1784948 B1 5/1971
DE 2314013 A1 10/1973
DE 2426718 A 12/1975
DE 2614236 A1 10/1977
DE 2921608 A1 12/1980
DE 3432113 A1 3/1986
DE 3812819 A1 10/1989
DE 3904763 A1 10/1989
DE 4101277 A1 7/1992
DE 4226883 A 3/1993
DE 9304381 U1 5/1993
DE 9305852 U1 7/1993
DE 4341905 A 6/1994
DE 9408764 U1 10/1995
DE 19603638 A1 10/1996
DE 19530838 A 2/1997
DE 29705765 U1 7/1997
DE 19644346 A 4/1998
DE 19709938 A1 9/1998
DE 19716890 A1 11/1998
DE 29812573 U1 11/1998

(56) References Cited

FOREIGN PATENT DOCUMENTS

| | | | |
|---|---|---|---|
| DE | 29814768 | U1 | 1/1999 |
| DE | 19733801 | A1 | 2/1999 |
| DE | 19805265 | A | 4/1999 |
| DE | 29822689 | U1 | 4/1999 |
| DE | 19751255 | A1 | 5/1999 |
| DE | 29807430 | U1 | 5/1999 |
| DE | 29822686 | U1 | 5/1999 |
| DE | 19805348 | A1 | 8/1999 |
| DE | 19807454 | A1 | 8/1999 |
| DE | 19832731 | A | 6/2000 |
| DE | 19858961 | A1 | 6/2000 |
| DE | 19858960 | A1 | 7/2000 |
| DE | 20111569 | U1 | 9/2001 |
| DE | 10053408 | A1 | 5/2002 |
| DE | 10060183 | A1 | 6/2002 |
| DE | 20204044 | U1 | 7/2002 |
| DE | 20301926 | U1 | 4/2003 |
| DE | 20302826 | U1 | 5/2003 |
| DE | 10226268 | A1 | 10/2003 |
| DE | 10342605 | B3 | 12/2004 |
| DE | 102005029066 | A | 2/2006 |
| DE | 202005016444 | U1 | 2/2006 |
| DE | 202005019973 | U1 | 4/2006 |
| DE | 102004062060 | | 5/2006 |
| DE | 69734014 | | 6/2006 |
| DE | 202006002859 | U1 | 6/2006 |
| DE | 202006002860 | U1 | 6/2006 |
| DE | 202006013257 | U1 | 11/2006 |
| DE | 202006017741 | U1 | 2/2007 |
| DE | 202008009334 | U1 | 10/2008 |
| DE | 102009020597 | A | 11/2009 |
| DE | 202009005021 | U1 | 12/2009 |
| DE | 102009009504 | B3 | 4/2010 |
| DE | 102010006127 | A1 | 8/2011 |
| EP | 0029984 | A | 6/1981 |
| EP | 0230160 | A1 | 7/1987 |
| EP | 0483528 | A1 | 5/1992 |
| EP | 601488 | A | 6/1994 |
| EP | 0601488 | A2 | 6/1994 |
| EP | 0688934 | A2 | 12/1995 |
| EP | 0953715 | A2 | 11/1999 |
| EP | 0984131 | A1 | 3/2000 |
| EP | 0989279 | A2 | 3/2000 |
| EP | 1188895 | A2 | 3/2002 |
| EP | 1129270 | B1 | 8/2005 |
| EP | 1840320 | A1 | 10/2007 |
| EP | 1970525 | A2 | 9/2008 |
| EP | 1429920 | B1 | 3/2010 |
| FR | 1475287 | A | 3/1967 |
| GB | 796249 | A | 6/1958 |
| GB | 1138992 | A | 1/1969 |
| GB | 1520257 | A | 8/1978 |
| GB | 2142367 | A | 1/1985 |
| GB | 2411201 | A | 8/2005 |
| GB | 2432179 | A | 5/2007 |
| JP | S59190243 | A | 10/1984 |
| JP | H03172446 | A | 7/1991 |
| JP | H0545885 | A | 2/1993 |
| JP | H0589778 | U | 12/1993 |
| JP | H0711685 | B2 | 2/1995 |
| JP | H0813957 | A | 1/1996 |
| JP | H0886167 | A | 4/1996 |
| JP | H0886168 | A | 4/1996 |
| JP | H0893356 | A | 4/1996 |
| JP | H1122344 | A | 1/1999 |
| JP | H1181820 | A | 3/1999 |
| JP | H1181821 | A | 3/1999 |
| JP | H1193544 | A | 4/1999 |
| JP | 11247540 | H | 9/1999 |
| JP | H11336451 | A | 12/1999 |
| JP | 2000136681 | | 5/2000 |
| JP | 2000199388 | A | 7/2000 |
| JP | 2000199389 | A | 7/2000 |
| JP | 2000248857 | A | 9/2000 |
| JP | 2000319091 | A | 11/2000 |
| JP | 2002206383 | A | 7/2002 |
| JP | 2003227279 | A | 8/2003 |
| JP | 2004324284 | A | 11/2004 |
| JP | 2006090053 | A | 4/2006 |
| JP | 2010084440 | A | 4/2010 |
| KR | 20100106081 | A | 10/2010 |
| WO | 0005474 | A | 2/2000 |
| WO | 0005475 | A1 | 2/2000 |
| WO | 0214642 | A1 | 2/2002 |
| WO | 03024715 | A | 3/2003 |
| WO | 03087519 | A1 | 10/2003 |
| WO | 2004070150 | A2 | 8/2004 |
| WO | 2006000219 | A1 | 1/2006 |
| WO | 2006025953 | A | 3/2006 |
| WO | 2006027146 | A | 3/2006 |
| WO | 2006075922 | A1 | 7/2006 |
| WO | 2007098737 | A1 | 9/2007 |
| WO | 2008110362 | A1 | 9/2008 |
| WO | 2010133144 | A1 | 11/2010 |
| WO | 2011091986 | A2 | 8/2011 |

d2
b4
b7
22a
22a
1
d3
b5
30
14
10
b6
d5
20
22
h4
11
12
d4
11a
21
12a
31b
h1
31a
hr
17a
17b
16a
16b
d6
40
h3
hp
h6
hp
d7
13
b3
11b
b2
12b
d1
b1
y
x
z b8
72a
72b
b9
h8
75
76a
76b
h7
70
71
h9
73
74a
74b
b10
b11 d2
b7
1
d3
b5
30
10
b6
d5
20
h4
11a
12a
d4
31b
h1
31a
hr
16a
d6
70
16b
h3
hp
h6
hp
40
11b
12b 1
z
y
x
h1
40
72b
72a
70

1a
20

1b
101

70
100
70
80
100
52
50
53
100

14
61
20
61
70
52
1
11b
82a
82b
12b
81
40

80
53

Fig. 4a
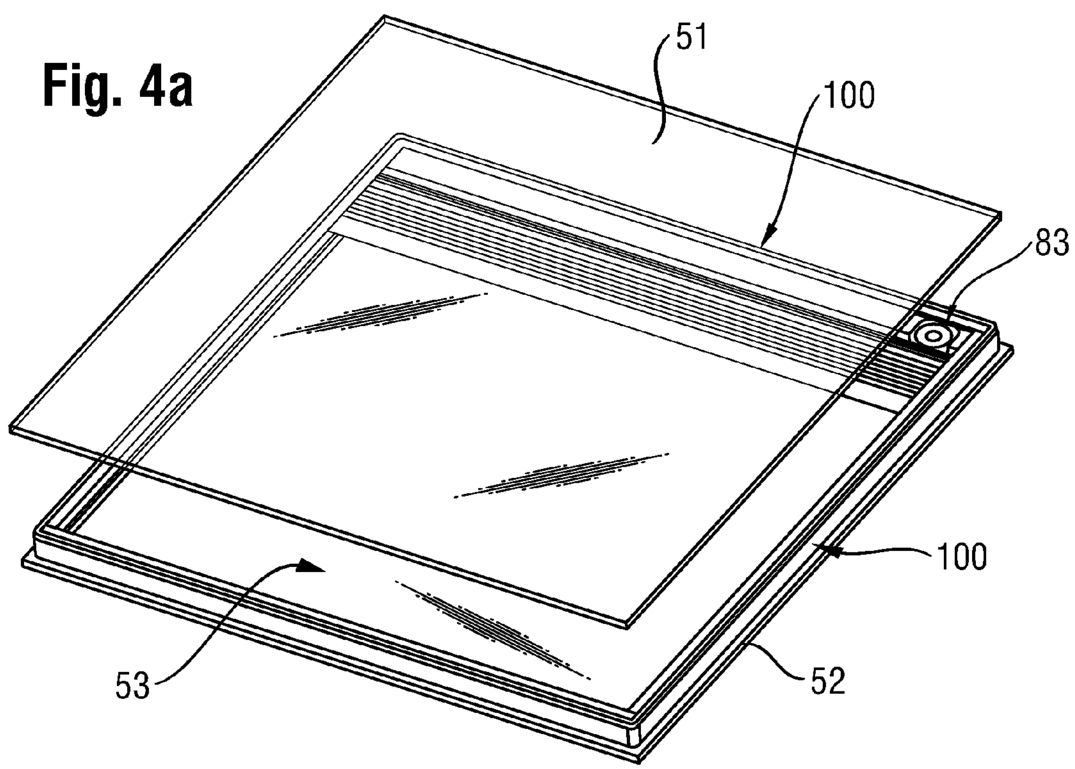
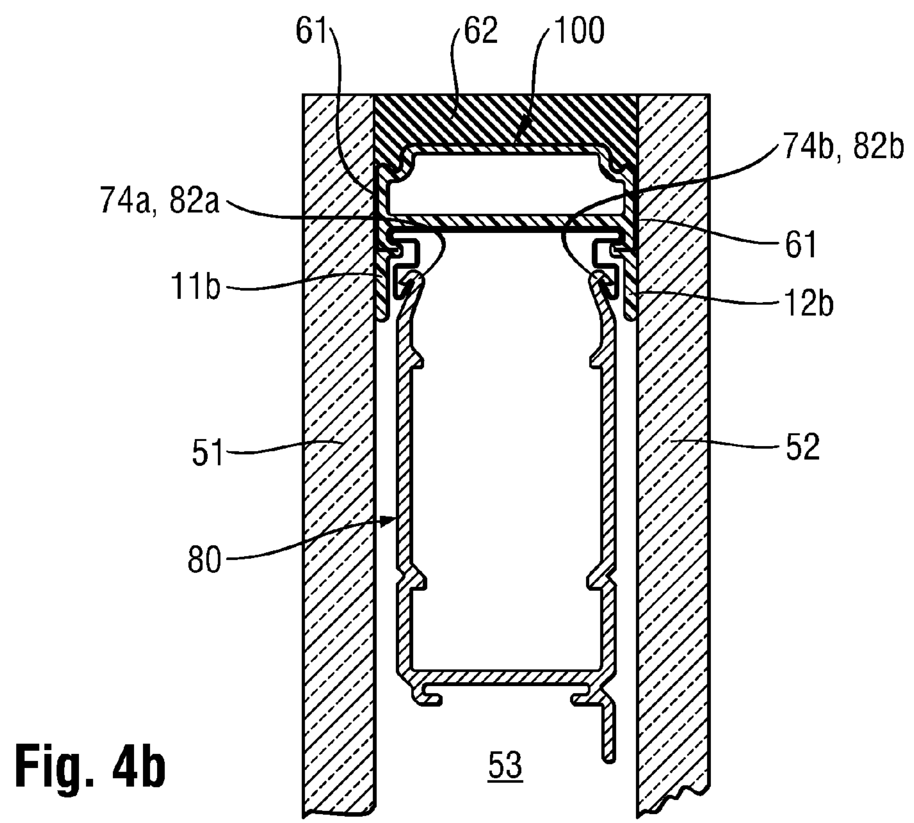
Fig. 4b

SPACER PROFILE FOR A SPACER FRAME FOR AN INSULATING GLASS UNIT WITH INTERSPACE ELEMENTS AND INSULATING GLASS UNIT

CROSS-REFERENCE

This application is the U.S. National Stage of International Application No. PCT/EP2013/000344 filed on Feb. 5, 2013, which claims priority to European patent application no. EP 12 154 994.3 filed on Feb. 10, 2012.

TECHNOLOGICAL FIELD

The present invention relates to spacer profiles and to insulating glass units with elements in the interspace between glass panes such as screens, blinds or similar interspace elements incorporating the spacer profiles.

Insulating glass units having at least two glass panes, which are held apart from each other in the insulating glass unit, are known. Insulating glass units are normally formed from an inorganic or organic glass or from other materials like Plexiglas. Therefore, the panes are also named glazing panes. Normally, the separation of the glazing panes is secured by a spacer frame (see reference number 1 in FIG. 8). The spacer frame is either assembled from several pieces using connectors or is bent from one piece, so that then the spacer frame is closable by a connector at only one position.

Various designs have been utilized for insulating glass units that are intended to provide good heat insulation. According to one design, the intervening space between the panes is preferably filled with inert, insulating gas, e.g., such as argon, krypton, xenon, etc. Naturally, this filling gas should not be permitted leak out of the intervening space between the panes. Consequently, the intervening space between the panes must be sealed accordingly. Moreover, nitrogen, oxygen, water, etc., contained in the ambient air naturally also should not be permitted to enter into the intervening space between the panes. Therefore, the spacer profile must be designed so as to prevent such diffusion. In the description below, when the term "diffusion impermeability" is utilized with respect to the spacer profiles and/or the materials forming the spacer profile, vapor diffusion impermeability, as well as also gas diffusion impermeability for the gases relevant herein, are meant to be encompassed within the meaning thereof.

Furthermore, the heat transmission of the edge connection, i.e. the connection of the frame of the insulating glass unit, of the glazing panes, and of the spacer frame, in particular, plays a very large role for achieving low heat conduction of these insulating glass units. Insulating glass units, which ensure high heat insulation along the edge connection, fulfill "warm edge" conditions as this term is utilized in the art.

Conventionally, spacer profiles were manufactured from metal. Such metal spacer profiles can not, however, fulfill "warm edge" conditions. Thus, in order to improve upon such metal spacer profiles, the provision of synthetic material on the metal spacer profile has been described, e.g., in U.S. Pat. No. 4,222,213 or DE 102 26 268 A1.

Although a spacer, which exclusively consists of a synthetic material having a low specific heat conductivity, could be expected to fulfill the "warm edge" conditions, the requirements of diffusion impermeability and strength would be very difficult to satisfy.

Other known solutions include spacer profiles made of synthetic material that are provided with a metal film as a diffusion barrier and reinforcement layer, as shown, e.g., in EP 0 953 715 A2 (family member U.S. Pat. No. 6,192,652) or EP 1 017 923 (family member U.S. Pat. No. 6,339,909) or DE 10 2010 006 127 A1 (family member US 2012/0297708 A1).

Such composite spacer profiles use a profile body made of synthetic material with a metal film, which should be as thin as possible in order to satisfy the "warm edge" conditions, but should have a certain minimum thickness in order to guarantee diffusion impermeability and strength. Such prior art "warm edge" spacer elements are usually solely designed with the purpose of obtaining "warm edge" conditions in insulating glass units such as double glazing systems, and hence cannot act as supports for interspace elements such as screens or blinds to be mounted therein. In other words, these "warm edge" spacer elements do not have the physical properties that can be typically obtained in extruded aluminum elements or bended/folded metal sheets, and hence cannot act as supports for interspace elements such as screens or blinds to be mounted in insulating glass units such as double glazing systems.

A double window pane assembly with a blind as an interspace element using spacer elements made of folded metal sheets or extruded metal profiles as guide elements for the interspace blinds is known from WO 2006/000219 A1 and U.S. Pat. No. 2,915,793. EP 0 688 934 A2 (family member U.S. Pat. No. 5,313,761) discloses a spacer assembly for an insulating glass unit for forming a spacer frame to which a mounting bar assembly is to be secured using clip means, which are secured to the spacer frame via latches connecting to flanges at the spacer frame.

EP 0 230 160 A1, U.S. Pat. No. 4,604,840, EP 1 129 270 B1, JP 2000-319091 A, CN 2329746 Y, WO 03/087519 A1 and GB 2 432 179 A also describe interspace blind element arrangements. U.S. Pat. No. 6,108,999, GB 2 411 201 A and DE 42 26 883 A1 describe to arrange double glass units with a specific type of outer glass panes and different types of panes arranged in the interspace for providing impact-resistance, fire-resistance or additional insulation.

SUMMARY

It is an object of the invention to provide improved spacer profiles, which enable to fulfill the "warm edge" conditions and mount interspace elements such as blinds in the interspace(s) of insulating glazing units.

BRIEF DESCRIPTION OF THE DRAWINGS

Additional features and objects will be apparent from the description of the exemplary embodiments with consideration of the figures, which show:

FIG. 4 in a) a partially exploded perspective view of the double glazing system of FIG. 3 with both panes and with the screen or blind engaged, and in b) a sectional view of the double glazing system of FIG. 4*a*);

DETAILED DESCRIPTION

Figure 1A:
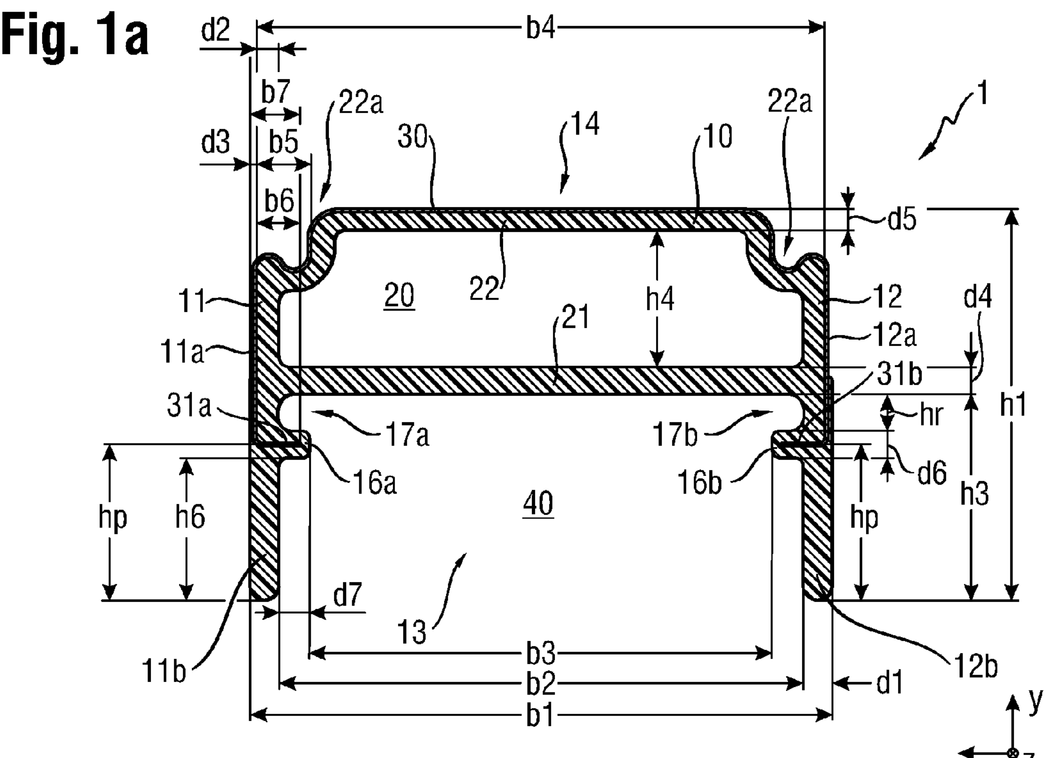
FIG. 1 in a) a sectional view of the spacer profile of an embodiment of the invention; in b) an embodiment of an interspace element holding means, in c) the embodiment of an interspace element holding means retained by the protrusions of the spacer profile, and in d) the insertion of the embodiment of an interspace element holding means into retaining recesses of the spacer profile.

Embodiments of the present teachings will be described in greater detail below with references to the figures. The same features/elements are marked with the same reference numbers in all figures. For the purpose of clarity, all reference numbers have not been inserted into all figures. The 3-dimensional (x, y, z) reference system shown in FIGS. 1 and 8 applies to the profiles, their cross sections and longitudinal directions shown in FIGS. 1 to 8. The longitudinal direction corresponds to the direction z, the traverse direction corresponds to the direction x and the height direction corresponds to the direction y in relation to the profiles.

A spacer profile 1 according to a first embodiment and an insulating glazing unit 50 using the same with a blind as an interspace element will now be described with reference to FIGS. 1 to 6.

In FIGS. 1 *a*) and *c*), 3 *b*), 4*b*), 5 and 6, the spacer profile 1 is shown in cross-section perpendicular to the longitudinal direction z, i.e. along a slice in the x-y plane, and extends with this constant cross-section in the longitudinal direction z. The spacer profile 1 has a height h1 in the height direction y and comprises a profile body 10, which is formed from a first material. The first material is preferably an elastic-plastic deformable, poor heat conducting (insulating) material.

Herein, the term "elastic-plastic deformable" preferably means that elastic restoring forces are active in the material after a bending process, as is typically the case for synthetic materials for which only a part of the bending takes place with a plastic, irreversible deformation. Further, the term "poor heat conducting" preferably means that the specific heat conductivity (thermal conductivity) λ is less than or equal to about 0.3 W/(mK).

The first material is preferably a synthetic material, more preferably a polyolefin and still more preferably polypropylene, polyethylene terephthalate, polyamide or polycarbonate. An example of such a polypropylene is Novolen® 1040K. The first material preferably has an E-modulus of less than or equal to about 2200 N/mm$^2$ and a specific heat conductivity λ less than or equal to about 0.3 W/(mK), preferably less than or equal to about 0.2 W/(mK).

The profile body 10 is firmly bonded (e.g., fusion and/or adhesive bonded) with a one-piece diffusion barrier film 30. The diffusion barrier film 30 is formed from a second material. The second material is preferably a plastic deformable material. Herein, the term "plastic deformable" preferably means that practically no elastic restoring forces are active after the deformation. This is typically the case, for example, when metals are bent beyond their elastic limit (apparent yield limit). Preferably, the second material is a metal, more preferably stainless steel or steel having a corrosion protection of tin (such as tin plating) or zinc. If necessary or desired, a chrome coating or a chromate coating may be applied thereto.

Herein, the term "firmly bonded" preferably means that the profile body 10 and the diffusion barrier film 30 are durably connected with each other, e.g. by co-extrusion of the profile body with the diffusion barrier film, and/or if necessary, by the application of an adhesive material. Preferably, the cohesiveness of the connection is sufficiently large that the materials are not separable in the peel test according to DIN 53282.

Furthermore, the diffusion barrier film additionally also preferably acts as a reinforcement element. Its thickness (material thickness) d1 is preferably less than or equal to about 0.30 mm, more preferably less than or equal to 0.20 mm, still more preferably less than or equal to 0.15 mm, still more preferably less than or equal to 0.12 mm, and still more preferably less than or equal to 0.10 mm. Moreover, the thickness d1 preferably is greater than or equal to about 0.10 mm, preferably greater than or equal to 0.08 mm, still preferably greater than or equal to 0.05 mm and still preferably greater than or equal to 0.03 mm. The maximum thickness is chosen so as to correspond to the desired specific heat conductivity and stability. As the film is made thinner, the "warm edge" conditions will be increasingly fulfilled. Each of the embodiments shown in the figures preferably has a thickness in the range of 0.05 mm-0.13 mm.

The preferred material for the diffusion barrier film is steel and/or stainless steel having a specific heat conductivity λ less than or equal to about 50 W/(mK), more preferably less than or equal to about 25 W/(mK) and still more preferably less than or equal to 15 W/(mK). The E-modulus of the second material preferably falls in the range of about 170-240 kN/mm$^2$ and is preferably about 210 kN/mm$^2$. The breaking elongation of the second material is preferably greater than or equal to about 15%, and more preferably greater than or equal to about 20%. An example of stainless steel film is the steel film 1.4301 or 1.4016 according to DIN EN 10 08812 having a thickness of 0.05 mm and an example of a tin plate film is a film made of Antralyt E2, 8/2, 8T57 having a thickness of 0.125 mm.

The profile body 10 comprises an inner wall 21 and an outer wall 22 separated by a distance h4 in the height direction y and two side walls 11, 12 that are separated by a distance b2 in the traverse direction x, and extend essentially in the height direction y. The side walls 11, 12 are connected via the inner wall 21 and outer wall 22, so that a chamber 20 is formed for accommodating hygroscopic material. The chamber 20 is defined on its respective sides in cross-section by the walls 11, 12, 21, 22 of the profile body 10. The chamber 20 comprises the height h4 in the height direction y. The side walls 11, 12 are formed as attachment bases for attachment to the inner sides of the glazing panes. In other words, the spacer profile is preferably adhered to the respective inner sides of the glazing panes via these attachment bases (see FIG. 3, 4, 5).

The inner wall 21 is defined herein as the "inner" wall, because it faces inward toward the intervening space 53 between the glazing panes in the assembled state of the insulating glazing unit. This side of the spacer profile, which faces towards the intervening space between the glazing (e.g. window) panes, is designated in the following description as the inner side 13 in the height direction y of the spacer profile 1. The outer wall 22, which is arranged in the height direction y on the opposite side of the chamber 20, faces away from the intervening space 53 between the glazing panes in the assembled state and therefore is defined herein as the "outer" wall. This side of the spacer profile, which faces away from the intervening space between the glazing (e.g. window) panes, is designated in the following description as the outer side 14 in the height direction y of the spacer profile 1.

According to the Wave-configuration shown in FIG. 1*a*), the portions forming the connections between the side walls 11, 12 and the outer wall 22 each comprise a concave portion 22*a*, 22*b*, when observed from outer side 14. Of course, other configurations of the portions forming the connections between the side walls 11, 12 and the outer wall 22 are possible, such as straight slant portions, e.g. with a 45° slant angle, 90° corner portions, etc. The outer wall 22 is preferably plane, except for the connecting portions to the side walls, as shown in FIG. 1*a*).

The side walls 11, 12 extend in the height direction y beyond the inner wall 21, in the shown embodiment over a height h3. These portions of the side walls 11, 12, extending beyond the inner wall 21 are named side wall legs 11*b*, 12*b* in the following. The portions of the side walls 11, 12 defining the chamber 20, i.e. those portions adjacent to the legs 11*b*, 12*b*, are indicated as upper side wall portions 11*a*, 12*a* in the following. As can be seen in FIGS. 1*a*) and 1*c*), the profile 1 has its largest width b1 in the lower portion, where the legs 11*b*, 12*b* are located. In the area of the upper side wall portions 11*a*, 12*a*, the profile 1 has a slightly smaller width b4 such that a step-like transition with a height or width d3 is created. The space created by this little step when the spacer profile 1 is positioned between the glazing panes 51, 52 allows the presence of an adhesive material (primary sealing compound) 61 in the area of the upper side wall portions 11*a*, 12*a* (see FIGS. 3 to 5) described later, whereas the legs 11*b*, 12*b* can contact the glazing panes 51, 52 without intermediate adhesive material.

The legs 11*b*, 12*b* have a thickness d1 in the transverse direction x and the upper side wall portions 11*a*, 11*b* have a thickness d2 in the transverse direction x. The inner wall 21 has a thickness d4 in the height direction y and the outer wall 22 has a thickness d5 in the height direction y. The thicknesses d1 and d2 are selected essentially based on stability criteria, whereas the thicknesses d4 and d5 are selected according to stability criteria but also in view of heat insulating characteristic criteria. The thicknesses d4 and d5 can be selected to be identical, but preferably the thickness d5 is smaller than the thickness d4 as the barrier layer 30 will contribute to the stability of the outer wall 22.

The concave portions 22*a*, 22*b* representing the connection/transitions between the side walls 11, 12 and the outer wall 22 have a width b5 in the transverse direction x from the outside of the upper side wall portions 11*a*, 12*a* to the last vertical portion forming the direct transition into the outer wall 22. The width b5 is selected to be as small as possible but still allowing a concave portion with a bottom being closer to the inner side 13 than the tips of the upper side wall portions 11*a*, 12*a*. The width b5 is preferably in the range of 5 to 15% of the width b4, i.e. of the distance b4 between the outer sides of the upper side wall portions 11*a*, 12*a*.

The legs 11*b*, 12*b* have a distance b2 in the transverse direction x. The legs and the inner wall 21 define a recess 40 open to the inner side 13, which open recess 40 may be embodied as a groove. At the sides of the legs 11*b*, 12*b* facing each other in transverse direction x, protrusions 16*a*, 16*b* are provided in a height h2=hp. The protrusions have a distance b3 in the transverse direction x smaller than the width b2 of the open recess 40. The protrusions 16*a*, 16*b* have, seen in the plane x-y, an approximately rectangular shape and extend along the longitudinal direction z as can be seen in FIG. 1*d*) and FIG. 2. Accordingly, retaining recesses 17*a*, 17*b* are defined by the protrusions 16*a*, 16*b*, the corresponding side walls 11, 12 and the inner wall 21, especially the portions of the inner wall 21 adjacent to the protrusions 16*a*, 16*b* and the side walls 11, 12. The retaining recesses 17*a*, 17*b* are open to the recess 40. They have a height hr in the height direction y and a depth d7 in the transverse direction x (d7=½(b2−b3)). Alternatively, different depths d7', d7" of the recesses may be provided on the two lateral sides, e.g. by different protrusions 16*a, b* or by different recesses. Obviously, the retaining recesses 17*a*, 17*b* could be defined without using the inner wall 21 by the side walls 11, 12 and the protrusions 16*a*, 16*b* as the protrusions 16*a*, 16*b* define the recesses 17*a*, 17*b* in the height direction Y towards the intervening space 53 (the inner side 13). Of course, it is also possible to use pairs of protrusions on each of the side walls 11, 12 to define recesses. In each case, it is possible to define the recesses. However, the double use of the inner wall 21 to define the chamber and the recesses is preferred.

The protrusions 16*a*, 16*b* have a height or thickness d6 in the height direction y.

In the embodiment shown in FIG. 1*a*), 1*c*), the legs extend over the height h6 in the height direction from the protrusions 16*a*, 16*b* away from the outer side 14. Depending on the application of the spacer profile 1, these portions of the legs 11*b*, 12*b* may be significantly shorter or longer than shown in FIG. 1*a*), 1*c*) or can be omitted.

Openings 15 (only shown in FIG. 8 but not in the other Fig.) are formed in the inner wall 21, so that the inner wall 21 is not formed to be diffusion-proof. In addition or in the alternative, to achieve a non-diffusion-proof design, it is also possible to select the material for the entire profile body and/or the inner wall, such that the material permits an equivalent diffusion without the formation of such openings 15. However, the formation of the openings 15 is preferable. In any case, moisture exchange between the intervening space 53 between the glazing panes and the hygroscopic material in the chamber 20 in the assembled state is preferably ensured.

The diffusion barrier film 30 is formed on the outer sides of the outer wall 22 and of the side walls 11, 12, which face away from the chamber 20. The film 30 extends along the side walls 11, 12 in the height direction y (seen from the outer side 14) to the height h4 of the chamber 20 and then inside the side walls 11, 12 to the (same) height h2=hp of protrusions 16*a*, 16*b* and horizontally into the same to a depth b6. In an alternative, the protrusions 16*a*, 16*b* may be provided at different heights. The L-shaped or flange shaped portions 31*a*, 31*b* of the diffusion barrier film 30 are profiled portions, each having a profile 31*a*, 31*b*. Herein, the term "profile" preferably means that the elongation portion not only means a linear elongation of the diffusion barrier film 30, but instead that a two-dimensional profile is formed in the two-dimensional view of the cross-section in the x-y plane, which profile is formed, for example, by one or more bends and/or angles in the elongation portion 31*a*, 31*b* or 31*c*, 31*d*.

According to the embodiment shown in FIG. 1*a*), the profile 31*a*, 31*b* comprises a bend (90°) and a portion (flange) directly adjacent thereto, which portion (flange) extends a length b7 in the traverse direction x from the outer side of the corresponding side wall 11, 12 toward the interior.

Figure 5:
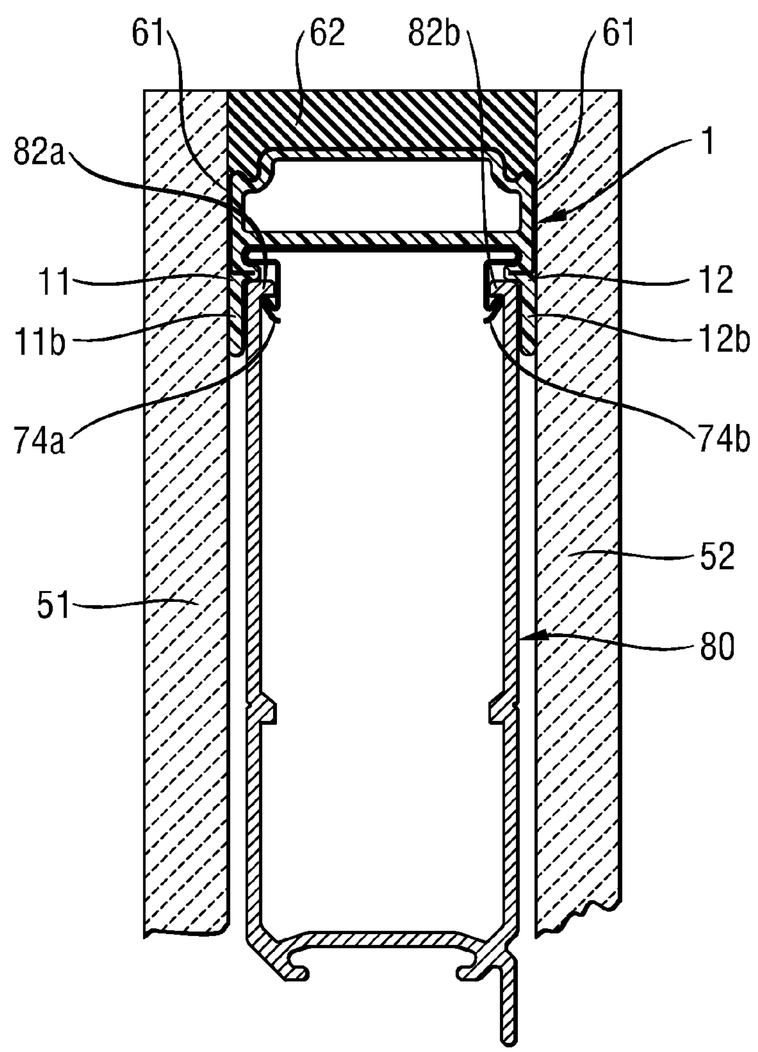
FIG. 5 a sectional view of a double glazing system according to another embodiment of the present invention.

As is shown in FIGS. 3 to 5, the side walls 11, 12 formed as attachment bases are adhered with the inner sides of the glazing panes 51, 52 using an adhesive material (primary sealing compound) 61, e.g., a butyl sealing compound based upon polyisobutylene. The intervening space 53 between the glazing panes is thus defined by the two glazing (e.g. window or door) panes 51, 52 and the spacer profile 1. The inner side 13 of the spacer profile 1 faces the intervening space 53 between the window panes 51, 52. On the outer side 14 facing away from the intervening space 53 between the glazing panes in the height direction y, a mechanically stabilizing sealing material (secondary sealing compound) 62, for example based upon polysulfide, polyurethane or silicon, is introduced into the remaining, empty space between the inner sides of the window panes in order to fill the empty space. This sealing compound also protects the diffusion barrier layer from mechanical or other corrosive/degrading influences.

The protrusions 16*a*, 16*b* and the recesses 17*a*, 17*b* are formed to be capable of retaining an interspace element holding means 70. An embodiment of an interspace holding element 70 is shown in FIG. 1*b*) in a cross-section x-y perpendicular to a longitudinal direction z and in FIG. 1*c*) in a state where it is inserted to be held by the protrusions 16*a*, 16*b* in the retaining recesses 17*a*, 17*b*.

Figure 1B:
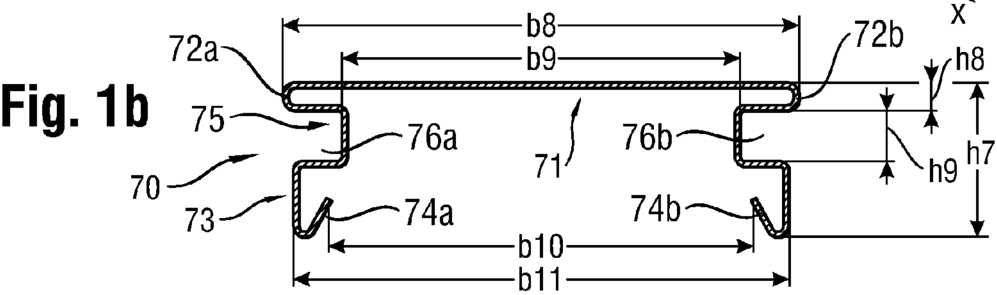
Figure 1C:
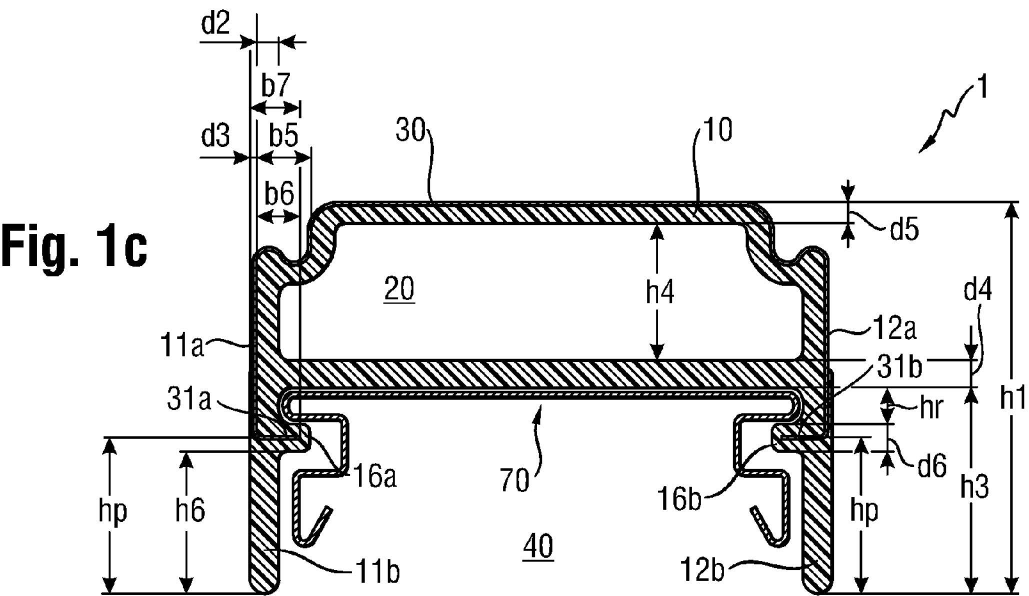
Figure 1D:
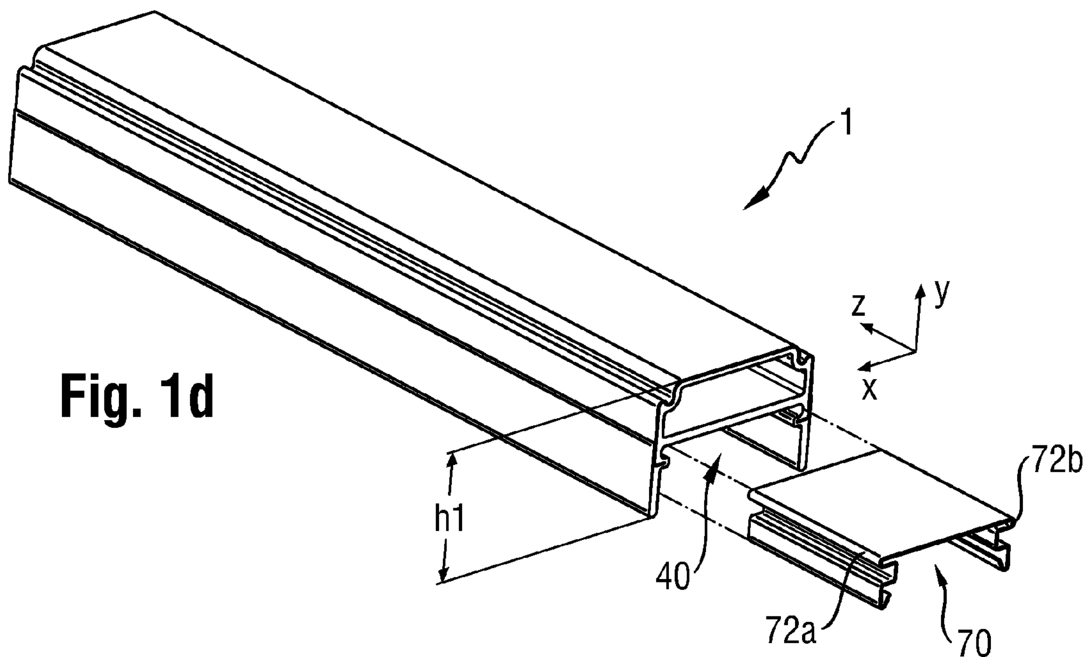

The interspace element holding means 70 shown in FIG. 1*b*) is a metal clamp formed of a metal sheet and bend into the cross-sectional shape shown in FIG. 1*b*). The length of the interspace element holding means 70 in the longitudinal direction z is not necessarily the same length as that of the spacer profile. Depending on the application and the interspace element to be held, plural interspace element holding means 70 can be inserted and held in the open recess 40. The thickness of the clamp is selected to provide an appropriate holding force for the interspace element to be held. Such interspace elements 80 to be held may be blinds or screens or other interspace elements such as solar panels etc.

The interspace holding means 70 in form of the metal clamp shown in FIG. 1*b*) comprises a retained portion 71 (the upper portion in FIG. 1*b*)) and a holding portion 73 (the lower portion in FIG. 1*b*) connected by an intermediate portion 75. The retained portion 71 comprises lateral edges 72*a*, 72*b* defining a width b8 in the transverse direction x of the interspace element holding means 70. The interspace element holding means 70 has a height h7 in the height direction y. The retained portion 71 has a height h8 in the height direction y, which is smaller than the height hr of the retaining recesses 17*a*, 17*b*. The intermediate portions 75 form recesses 76*a*, 76*b* which, seen in the cross-section x-y, have depth larger than the protrusion amount d7 of the protrusions 16*a*, 16*b* and a height h9 larger than the thickness d6 of the protrusions 16*a*, 16*b*. The outer sides of the holding portion 73 are separated by a distance b11 smaller than the distance b2 between the legs 11*b*, 12*b*. The holding portion 73 comprises hook-like portions 74*a*, 74*b*, where the tips of the hooks have a distance b10 smaller than the distance b11. The height h7 of the interspace element holding means 70 is preferably smaller than the height h3 of the open recess 40.

As can bee seen from FIG. 1*d*), an interspace element holding means 70 with a length in the longitudinal direction z significantly smaller than the length of the corresponding spacer profile 1 can be inserted to be held in the retaining recesses 17*a*, 17*b* by inserting the same in the longitudinal direction z.

Figure 2:
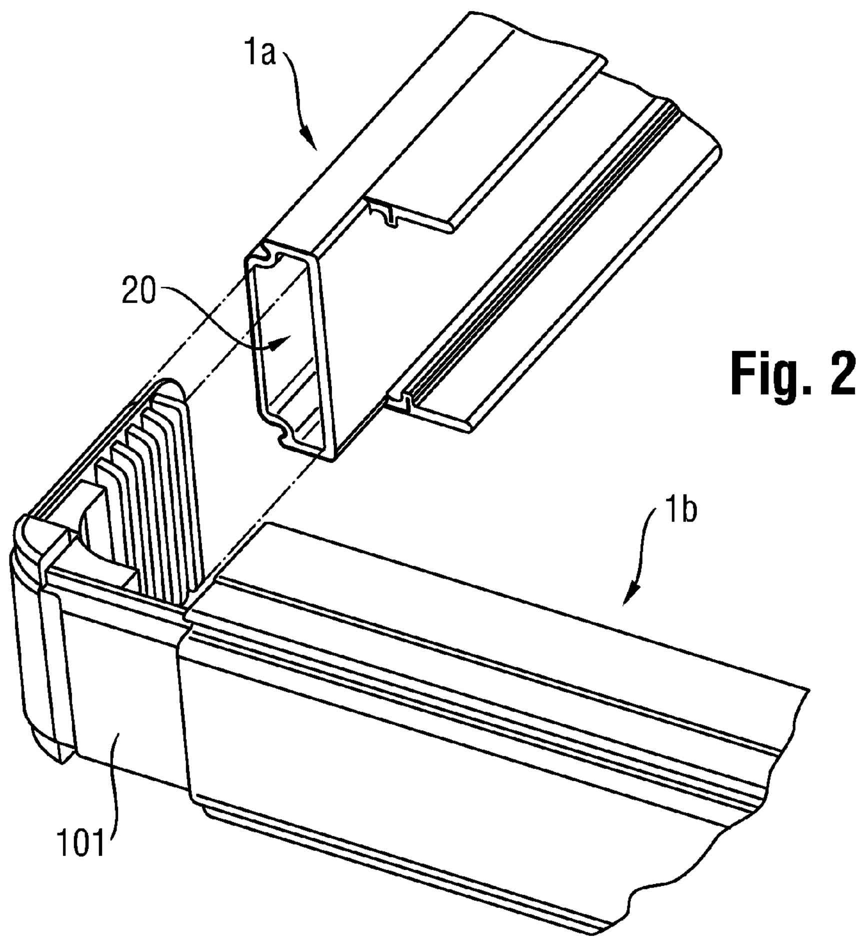
FIG. 2 a corner connection of spacer profiles to form a spacer frame.
Figure 3A:
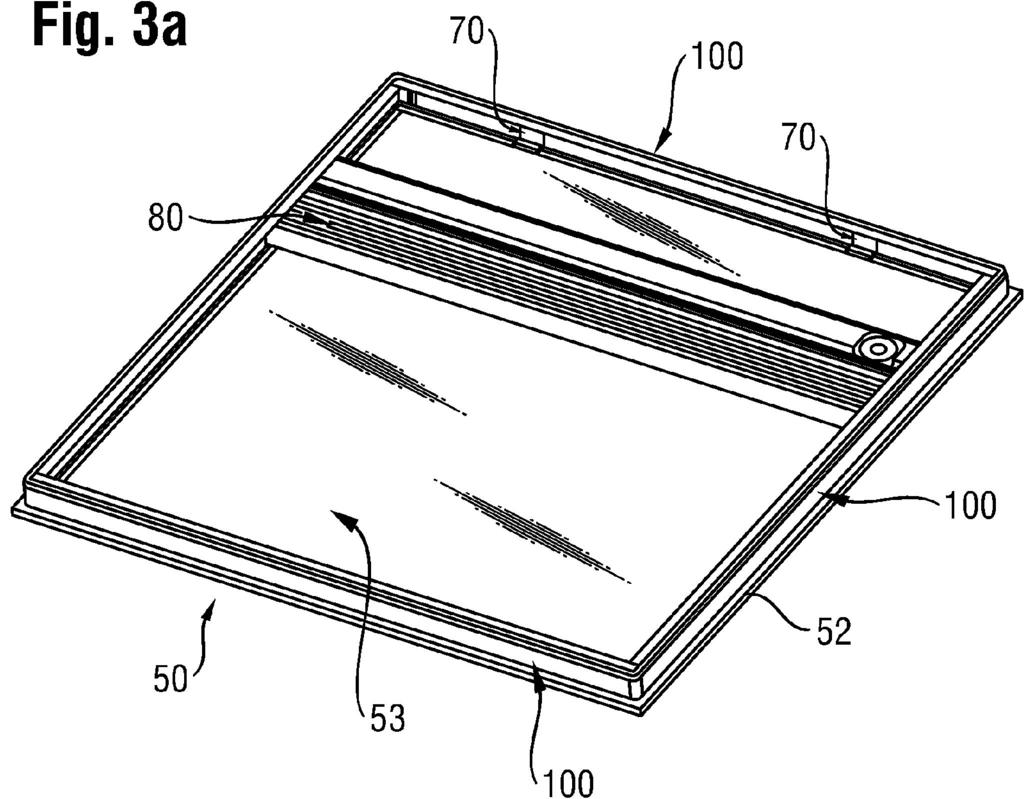
FIG. 3 in a) a perspective view of a double glazing system with a spacer frame of an embodiment of the invention, with one of the panes removed and with a screen or blind inserted at the center, although not engaged, and in b) a sectional view of the double glazing system of FIG. 3 a) with one of the panes removed and with the screen or blind engaged.

The spacer profile 1 shown in FIG. 1 is designed to be used as part of a spacer profile frame 100. Such a spacer profile frame can be formed by bending the spacer profile 1 and connecting the open ends of the spacer profile 1 by a connector, preferably a linear connector. In case of bending, the legs 11*b*, 12*b* can be cut-out at appropriate positions of the bends, e.g. in form of V cuts. This way of forming a spacer profile frame is not shown in the drawings. Alternatively, linear portions of the spacer profile 1 can be connected to a spacer profile frame by using corner connectors 101. The way of connecting the open ends of the spacer profile portions 1*a*, 1*b* with a corner connector 101 is shown in FIG. 2. In this case, the legs 11*b*, 12*b* of one end 1*b* of the spacer profile portions 1*a*, 1*b* are appropriately cut-out. Connector portions of the corner connector 101 are inserted into the space 20 of the spacer profile 1. These ways of forming spacer profile frames are well known in the art and not further explained here. When assembling an insulating glazing unit such as an insulating glass unit, a spacer profile frame 100 is formed of the spacer profile 1 and attached to one glazing pane 52 as shown in FIG. 3*a*). The attachment is performed by using an adhesive material 61 as already explained above.

As can be seen very well in FIG. 3*a*), an interspace element 80 for provision within the intervening space 53 between glazing panes of an insulating glass unit can be arranged in the space. Such an interspace element 80 is shown to be a blind as an exemplary interspace element in FIG. 3*a*). The blind can be attached and held by a plurality of interspace element holding means 70 as shown in FIG. 3*a*), which have been inserted to be retained by the spacer profile as explained before and shown in FIG. 3*b*). As can also be seen in FIG. 3*a*), the interspace element holding means do not have the same length as the spacer profile on the same side of the intervening space 53. Therefore, in the case shown in FIG. 3*a*) the holes 15 for communication of chamber 20 with the intervening space 53 are not covered by interspace element holding means 70 over nearly the entire length of the spacer profile 1. Alternatively, a single interspace element holding means 70 can be used.

Figure 3B:
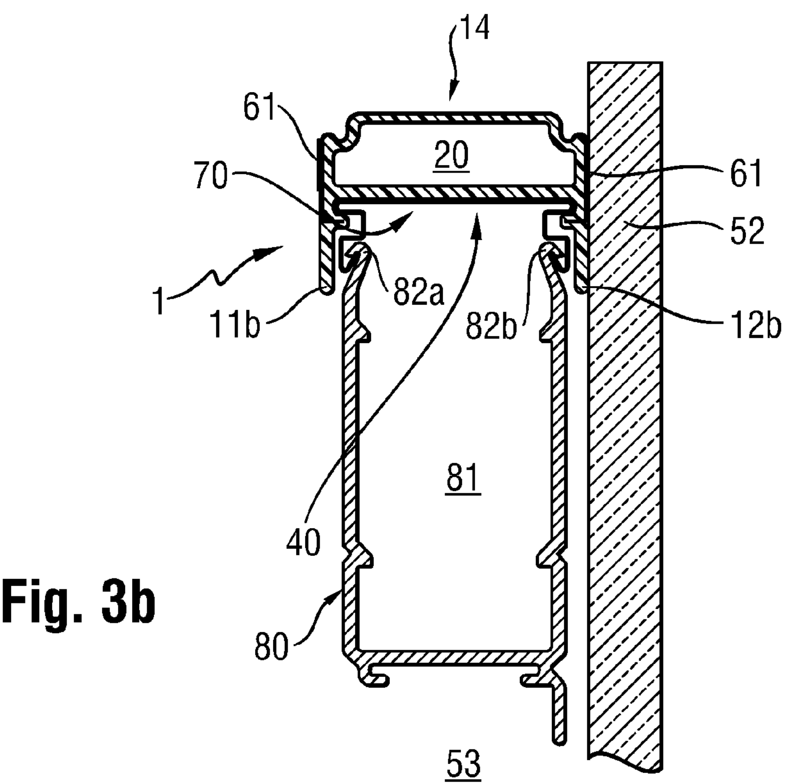
Figure 6:
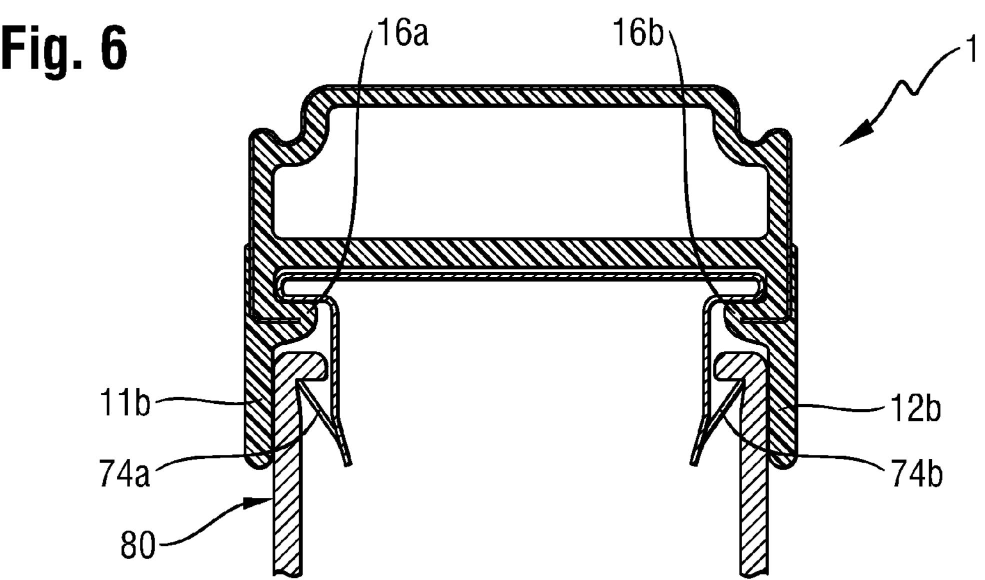
FIG. 6 a detail sectional view of a double glazing system according to another embodiment of the present invention.

In FIG. 3*b*), the interspace element 80 engages with the interspace element holding means 70 by use of hook-like portions 82*a*, 82*b* formed complementary to the hook-like portions 74*a*, 74*b* of the interspace element holding means 70. Of course, other shapes of engaging means for engaging the interspace element 80 with the interspace element holding means 70 are easily conceivable. Alternative examples are shown in FIGS. 5 and 6, were the directions of the hooks 74*a, b*, 82*a, b* are reversed.

After mounting the interspace element 80 and connecting it to the interspace element holding means 70, the second glazing pane 51 is attached to the spacer profile frame 100 using adhesive material 61 and the sealing 62 is attached in the manner already described. The corresponding assembly is shown in FIGS. 4*a*) and *b*). The interspace element 80, which is exemplified to be a blind in FIG. 3, 4, comprises operating means 83 to move the blind elements up and down in the glazing unit. In the example, the operating unit 83 is capable of being driven in a contactless manner such that a separate direct connection into the intervening space 53 is not necessary. Of course, if a mechanical drive requiring a direct connection is necessary, specific measures to seal the operating unit 83 are necessary. If the interspace element holding means 70 and/or the interspace element 80 cover the inner side 13 of the spacer profile 1 to a large extent such that a diffusion of gas or vapor through the inner wall 21 is hindered, the interspace element holding means and/or the interspace element are provided with openings/passages to allow a gas flow from the intervening space 53 to the chamber 20.

All details concerning the first embodiment also apply to all the other described embodiments, except when a difference is expressly noted or is shown in the figures.

Figure 7:
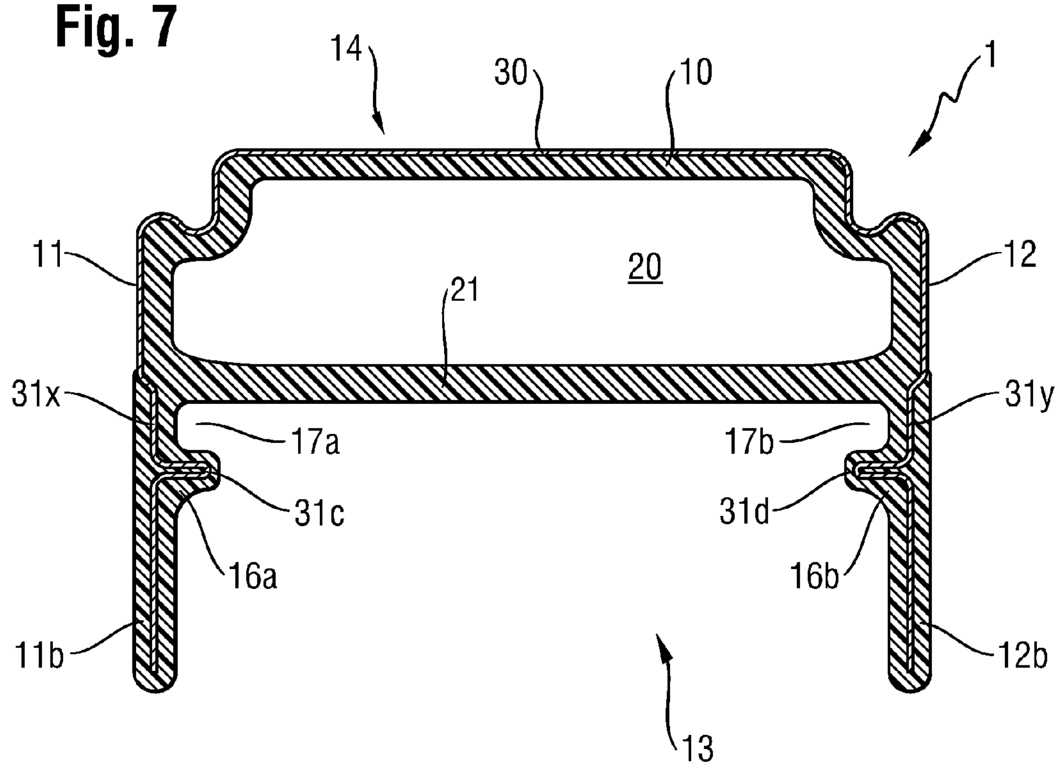
FIG. 7 a sectional view of a spacer profile according to another embodiment of the present invention.
Figure 8A:
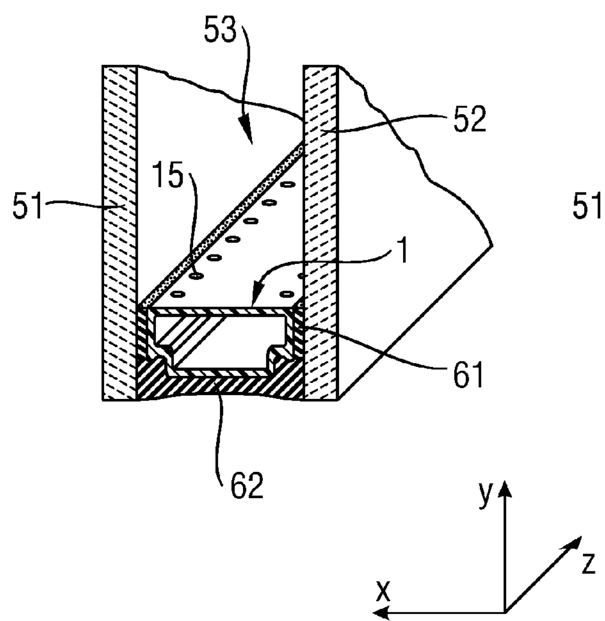
FIGS. 8 *a*) and *b*), respectively, perspective cross-sectional views of the configuration of the glazing panes and spacer profile in a conventional insulating glazing unit.
Figure 8B:
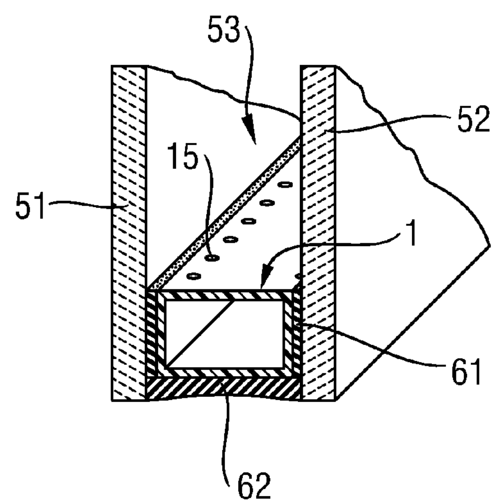

A second embodiment of the spacer profile 1 is shown in FIG. 7. The embodiment differs from the first embodiment essentially by the shape of the diffusion barrier film within the protrusions 16*a*, 16*b* and the legs 11*b*, 12*b*. The portions of the barrier film 30 extending within the side walls 11, 12 are indicated to be 31*x*, 31*y* and they comprise profiled portions 31*c*, 31*d* having a 180° bend extending into the protrusions 16*a*, 16*b*. Furthermore, the portions 31*x*, 31*y* also extend into the legs 11*b*, 12*b* nearly down to the distal edge of the legs 11*b*, 12*b* at the inner side 13. This shape of the portions 31*x*, 31*y* is selected to provide a greater stability to the legs 11*b*, 12*b* and to the protrusions 16*a*, 16*b*. In particular, the profile portions 31*c*, 31*d* will provide a greater stability to the protrusions 16*a*, 16*b*, allowing to provide a greater retaining force to hold an element in the retaining recesses 17*a*, 17*b*.

Further possible modifications of the embodiments are discussed below. Obviously, an interspace element 80 could also be directly held by the retaining means 17*a*, 17*b* without using the intermediate interspace element holding means 70, if the interspace elements 80 are adapted to be retained. However, it is preferable to use the interspace element holding means 70 to ensure better heat insulation characteristics. In particular, the interspace holding element retaining means could be formed to provide a heat conduction cross-section as small as possible, in comparison to a direct holding of the interspace elements 80. In order to maintain "warm edge" characteristics, this may be of great importance. The legs 11*b*, 12*b* are in particular useful, if elements moving in the intervening space 53 are used such as blinds.

The interspace element holding means 70 can also be integrated in the spacer profile 1, e.g., by coextruding the spacer profile with the interspace holding means 70 in form of a metal clamp. The legs 11*b*, 12*b* of the spacer profile 1 may be adapted to guide moving portions of the interspace element 80. For example, the legs 11*b*, 12*b* may be adapted to guide the slats of a blind. In case of insulating glass units with a low emissivity coating on the insides of the glass panes, the legs 11*b*, 12*b* may be adapted to prevent a contact/damage of the same by the interspace element, especially by providing a shape and/or thickness of the legs preventing such a contact even in case of thermal expansion or other deformation of the glass pane and/or the interspace element. The legs 11*b*, 12*b* of the spacer profile 1 may be adapted to cover a lateral gap between the interspace element 80 and the spacer profile 1. For example, the legs 11*b*, 12*b* may be adapted to cover a lateral gap between a box of the blind at the top of the insulating glass unit or at the bottom end of the same and/or they may be adapted to cover the lateral ends of the slats of a blind. For example, the legs may entirely enclose the outer pats of a blind or other interspace element 80 and hide any end imperfection or the like. The spacer profile may be manufactured in different colors. In case of using suitable materials, especially PP, the coloring material may be provided "inside" the PP and no film or coated surfaces are necessary, which may be subject to visible scratches. Different colors of different portions such as a difference between the indoor and outdoor sides are possible. The diffusion barrier film 30 may be formed and positioned in the spacer profile 1 such that the diffusion barrier film 30 forms the surface of the spacer profile 1 at those portions of the spacer profile 1, which are in contact with the retained interspace element holding means 70 or the retained interspace element 80. For example, such contact portions are those portions of the protrusions 16*a*, 16*b* which contact the retained portion 71 at the lateral edges 72*a*, 72*b* under load. When the diffusion barrier film 30 forms the surface of the spacer profile 1 at those portions of the spacer profile 1, no flow of the elastic-plastic deformable material such as PP will occur under the weight load exerted at the contact portions. In the second embodiment, the barrier film portions 31*x*, 31*y* extending in the legs 11*b*, 12*b* may be formed of two parts separated e.g. at the 180° bends in the protrusions. In such a case the lower parts are basically L-shaped parts added to but separated from the barrier film of FIG. 1.

The insulating glass units can be used for doors, windows, facade elements, indoor partition walls, roofs and the like. The material of the glazing panes is not limited to glass but can be other transparent or semi-transparent glazing materials like Plexiglas or others.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A spacer profile for use as part of a spacer profile frame, which is suitable for being mounted in and/or along an edge area of an insulating glazing unit for forming and maintaining an intervening space between glazing panes, wherein the spacer profile extends in a longitudinal direction (z) and comprises in a cross section (x-y) perpendicular to the longitudinal direction (z), a first width (b1) in a transverse direction (x), which is perpendicular to the longitudinal direction (z), and comprises a first height (h1) in a height direction (y), which is perpendicular to the longitudinal direction (z) and to the transverse direction (x), and comprises an inner side in the height direction (y), which is arranged to face towards the intervening space in the assembled state of the spacer profile frame, and an outer side, which is arranged to face away from the inner side, the spacer profile comprising:

a profile body formed from a first heat insulating material and having, as viewed in the cross section (x-y) perpendicular to the longitudinal direction (z), outer side walls extending in the height direction and being separated by a distance (b2) in the transverse direction smaller than the first width (b1), the outer side walls defining a longitudinal groove which is open to the inner side and each side wall having an inner protrusion protruding towards the opposite side wall into the groove, and a diffusion barrier film made from a second material and firmly bonded with the profile body and, as viewed in the cross section (x-y) perpendicular to the longitudinal direction (z), continuously extending: (i) in the transverse direction (x) over the profile body on the outer side of the spacer profile, (ii) continuing in the height direction (y): (a) on the outside of the side walls and/or (b) in the side walls to a second height (hp), and (iii) extending into the protrusions.

2. The spacer profile according to claim 1, further comprising:

retaining recesses formed adjacent to the protrusions in the height direction (y) on the side opposite to the inner side of the spacer profile, and defined by the protrusions and the inner wall.

3. The spacer profile according to claim 1, wherein the profile body defines therein a chamber for accommodation of hygroscopic material, wherein the chamber: (i) is laterally defined in the transverse direction (x) by the side walls, (ii) is located further away from the inner side of the spacer profile in the height direction (y) than the protrusions, and (iii) is formed so as to be not diffusion-proof in the height direction (y) towards the inner side of the spacer profile.

4. The spacer profile according to claim 3, wherein an inner wall extending between the side walls in the transverse direction (x) defines the chamber towards the inner side of the spacer profile and/or defines retaining recesses towards the outer side of the spacer profile.

5. A spacer profile for use as part of a spacer profile frame, which is suitable for being mounted in and/or along an edge area of an insulating glazing unit for forming and maintaining an intervening space between glazing panes, wherein the spacer profile extends in a longitudinal direction (z) and comprises in a cross section (x-y) perpendicular to the longitudinal direction (z), a first width (h1) in a transverse direction (x), which is perpendicular to the longitudinal direction (z), and comprises a first height (h1) in a height direction (y), which is perpendicular to the longitudinal direction (z) and to the transverse direction (x), and comprises an inner side in the height direction (y), which is arranged to face towards the intervening space in the assembled state of the spacer profile frame, and an outer side, which is arranged to face away from the inner side, the spacer profile comprising:

a profile body formed from a first heat insulating material and having, as viewed in the cross section (x-y) perpendicular to the longitudinal direction (z), outer side walls extending in the height direction and being separated by a distance (b2) in the transverse direction smaller than the first width (b1) and an inner wall extending between the side walls in the transverse direction (x), the inner wall and the outer side walls defining a longitudinal groove open to the intervening space, each side wall having an inner protrusion protruding towards the opposite side wall, a diffusion barrier film made from a second material and firmly bonded with the profile body and, as viewed in the cross section (x-y) perpendicular to the longitudinal direction (z), continuously extending: (i) in the transverse direction (x) over the profile body on the outer side of the spacer profile, (ii) continuing in the height direction (y): (a) on the outside of the side walls and/or (ii) in the side walls to a second height (hp), and (iii) extending into the protrusions, and retaining recesses formed adjacent to the protrusions in the height direction (y) on the side opposite to the inner side of the spacer profile and defined by the protrusions and the inner wall.

6. The spacer profile according to claim 5, wherein the profile body defines therein a chamber for accommodation of hygroscopic material, wherein the chamber: (i) is laterally defined in the transverse direction (x) by the side walls, (ii) is located further away from the inner side of the spacer profile in the height direction (y) than the protrusions, (iii) is formed so as to be not diffusion-proof in the height direction (y) towards the inner side of the spacer profile, and (iv) the inner wall defines the chamber towards the inner side of the spacer profile.

7. The spacer profile according to claim 1, wherein the diffusion barrier film comprises in the cross-section (x-y) perpendicular to the longitudinal direction (z) a profiled elongation portion located at least partly in the protrusions.

8. The spacer profile according to claim 1, wherein the side walls are formed as an attachment base for the glazing panes of the insulating glazing unit.

9. The spacer profile according to claim 1, wherein the diffusion barrier film extends into the protrusions in the transverse direction (x) until a distance (b7) from the outside of the side walls.

10. The spacer profile according to claim 1, wherein the first material is a synthetic material, preferably polyolefin and still more preferably polypropylene, and the second material is a metal, preferably stainless steel or steel having a corrosion protection made of tin (tin plating) or zinc, and/or the second material preferably has an E-modulus in the range of 170-240 $N/mm^2$, preferably about 210 $N/mm^2$, a specific heat conductivity λ, less than or equal to 50 W/(mK), preferably less than or equal to 25 W/(mK), still more preferably less than or equal to 15 W/(mK), and/or the diffusion barrier film preferably has a thickness greater than or equal to 0.03 mm and smaller than or equal to 0.3 mm.

11. An insulating glazing unit comprising:

at least two glazing panes arranged to oppose each other with a separation distance therebetween so as to form an intervening space between the glazing panes, and a spacer profile frame formed from a spacer profile according to claim 1 and at least partially defining the intervening space between the glazing panes, wherein the side walls of the spacer profile are, as attachment bases, adhered with a diffusion-proof adhesive material essentially along their entire length and at least partly in the height direction with the inner side of the glazing panes that face thereto, an interspace element holding means is retained by the protrusions, and an interspace element is held by the interspace element holding means in the intervening space between the glazing panes.

12. The insulating glazing unit according to claim 11, wherein the interspace element holding means has a retained portion having a width (b8) in the transverse direction (x) larger than a distance (b3) of the protrusions in the transverse direction (x) and a holding portion adapted to hold the interspace element.

13. The insulating glazing unit according to claim 11, wherein the interspace element holding means is a metal clamp.

14. The insulating glazing unit according to claim 11, wherein the interspace element holding means and/or the interspace element comprises openings for allowing a gas flow from the intervening space to the spacer profile on the side opposite to the interspace element holding means.

15. The insulating glazing unit according to claim 11 wherein the spacer profile frame is adapted to guide the interspace element.

16. The spacer profile according to claim 5, wherein the diffusion barrier film comprises in the cross-section (x-y) perpendicular to the longitudinal direction (z) a profiled elongation portion located at least partly in the protrusions.

17. The spacer profile according to claim 5, wherein the side walls are formed as an attachment base for the glazing panes of the insulating glazing unit.

18. The spacer profile according to claim 5, wherein the diffusion barrier film extends into the protrusions in the transverse direction (x) until a distance (b7) from the outside of the side walls.

19. The spacer profile according to claim 5, wherein the first material is a synthetic material, preferably polyolefin and still more preferably polypropylene, and the second material is a metal, preferably stainless steel or steel having a corrosion protection made of tin (tin plating) or zinc, and/or the second material preferably has an E-modulus in the range of 170-240 $N/mm^2$, preferably about 210 $N/mm^2$, a specific heat conductivity $\lambda$, less than or equal to 50 W/(mK), preferably less than or equal to 25 W/(mK), still more preferably less than or equal to 15 W/(mK), and/or the diffusion barrier film preferably has a thickness greater than or equal to 0.03 mm and smaller than or equal to 0.3 mm.

20. An insulating glazing unit comprising:

at least two glazing panes arranged to oppose each other with a separation distance therebetween so as to form an intervening space between the glazing panes, and a spacer profile frame formed from a spacer profile according to claim 5 and at least partially defining the intervening space between the glazing panes, wherein the side walls of the spacer profile are, as attachment bases, adhered with a diffusion-proof adhesive material essentially along their entire length and at least partly in the height direction with the inner side of the glazing panes that face thereto, an interspace element holding means is retained by the protrusions, and an interspace element is held by the interspace element holding means in the intervening space between the glazing panes.

* * * * *

UNITED STATES PATENT AND TRADEMARK OFFICE

CERTIFICATE OF CORRECTION

PATENT NO. : 9,810,016 B2
APPLICATION NO. : 14/377520
DATED : November 7, 2017
INVENTOR(S) : Alessandro Pellini et al.

It is certified that error appears in the above-identified patent and that said Letters Patent is hereby corrected as shown below:

In the Claims

In Claim 5, at Column 11, Line 28, replace "a first width (h1)" with -- a first width (b1) --.

Signed and Sealed this
Nineteenth Day of December, 2017

Joseph Matal

Joseph Matal
*Performing the Functions and Duties of the*
*Under Secretary of Commerce for Intellectual Property and*
*Director of the United States Patent and Trademark Office*